United States Patent
Goldring et al.

(10) Patent No.: US 9,873,506 B2
(45) Date of Patent: Jan. 23, 2018

(54) COMPOSITE ACTUATOR ROD END ASSEMBLY

(71) Applicant: Goodrich Corporation, Charlotte, NC (US)

(72) Inventors: Eric Goldring, Mississauga (CA); Rony Giovanni Ganis, Oakville (CA)

(73) Assignee: GOODRICH CORPORATION, Charlotte, NC (US)

( * ) Notice: Subject to any disclaimer, the term of this patent is extended or adjusted under 35 U.S.C. 154(b) by 446 days.

(21) Appl. No.: 14/664,366

(22) Filed: Mar. 20, 2015

(65) Prior Publication Data

US 2016/0272304 A1    Sep. 22, 2016

(51) Int. Cl.

| F16J 10/02 | (2006.01) |
|---|---|
| B64C 25/22 | (2006.01) |
| B23K 31/02 | (2006.01) |
| F16J 1/12 | (2006.01) |
| F15B 15/14 | (2006.01) |
| F16H 25/20 | (2006.01) |
| F16D 1/08 | (2006.01) |

(52) U.S. Cl.
CPC ............. *B64C 25/22* (2013.01); *B23K 31/02* (2013.01); *F15B 15/1438* (2013.01); *F16D 1/08* (2013.01); *F16H 25/20* (2013.01); *F16J 1/12* (2013.01); *F16H 2025/2037* (2013.01)

(58) Field of Classification Search
CPC ..... F15B 15/1457; F15B 15/1438; F16J 1/12; F16H 2025/2037
USPC ......................................................... 92/169.1
See application file for complete search history.

(56) References Cited

U.S. PATENT DOCUMENTS

| 4,548,428 A | 10/1985 | Ruhle | |
|---|---|---|---|
| 5,154,109 A * | 10/1992 | Fluga | F15B 15/1447 |
| | | | 29/888.046 |
| 5,415,079 A * | 5/1995 | Ching | B29C 63/10 |
| | | | 92/169.2 |
| 9,482,266 B2 * | 11/2016 | Dewhirst | F16C 3/026 |
| 2007/0001451 A1 | 1/2007 | Struven | |

FOREIGN PATENT DOCUMENTS

| DK | 1859189 | 3/2013 | |
|---|---|---|---|
| EP | 2436600 | 4/2012 | |
| WO | WO 2009066070 A1 * | 5/2009 | ............. F16C 3/026 |
| WO | 2014202081 | 12/2014 | |

OTHER PUBLICATIONS

Extended European Search Report dated Feb. 7, 2017 in European Application No. 16161461.5.

* cited by examiner

*Primary Examiner* — Michael Leslie
(74) *Attorney, Agent, or Firm* — Snell & Wilmer, L.L.P.

(57) ABSTRACT

The present disclosure describes composite actuator piston rods and methods for making such rods. Composite actuator piston rods of the present disclosure may include a flared end and an embedded nut positioned within the flared end. A rod end assembly may be secured to the embedded nut. The rod end assembly may include a rod attachment end with a threaded surface configured to engage the embedded nut and a edge configured to compress a portion of the flared end. The rod end assembly may also include an external nut proximate to the wedge and configured to exert a force against the wedge.

16 Claims, 3 Drawing Sheets

COMPOSITE ACTUATOR ROD END ASSEMBLY

FIELD

The present disclosure relates generally to actuators and more specifically to actuators having composite actuator piston tubes.

BACKGROUND

Conventionally, various types of aircraft utilize actuators including, for example, to deploy nose, body, and/or wheel landing gear systems. Conventional actuator components are made of metallic materials and often comprise complex geometries and high strengths. However, these metallic components are typically heavy.

SUMMARY

An actuator according to various embodiments is disclosed. The actuator may include a composite actuator rod tube having an unflared portion and a flared end, an embedded nut having a threaded surface, wherein the embedded nut has a complementary shape to the flared end, and a rod end assembly. The rod end assembly may include a rod attachment end having a threaded surface configured to engage with the threaded surface of the embedded nut, a wedge configured to compress a portion of the flared end, and an external nut proximate to the wedge and configured to exert a force against the wedge.

A method for forming an actuator according to various embodiments is disclosed. The method may include forming a composite actuator rod tube having a flared end concentrically surrounding an embedded nut having a complementary shape to the flared end, and bonding the embedded nut to the composite actuator rod tube.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

The present disclosure describes actuators having a composite actuator rod. Such actuators may be used in aircraft systems, such as, for example, landing gear systems. However, the systems and methods of the present disclosure may be suitable for use in non-aircraft systems as well.

Figure 1A:
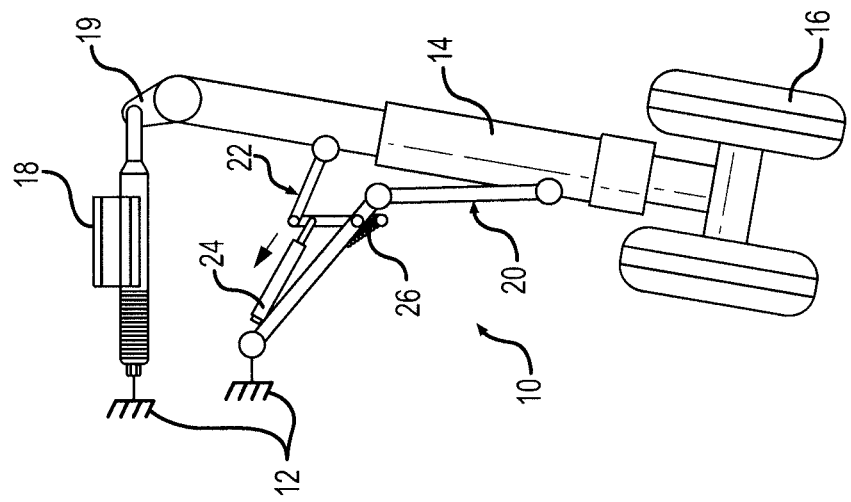
FIGS. 1A and 1B illustrate side views of a landing gear system in accordance with various embodiments.
Figure 1B:
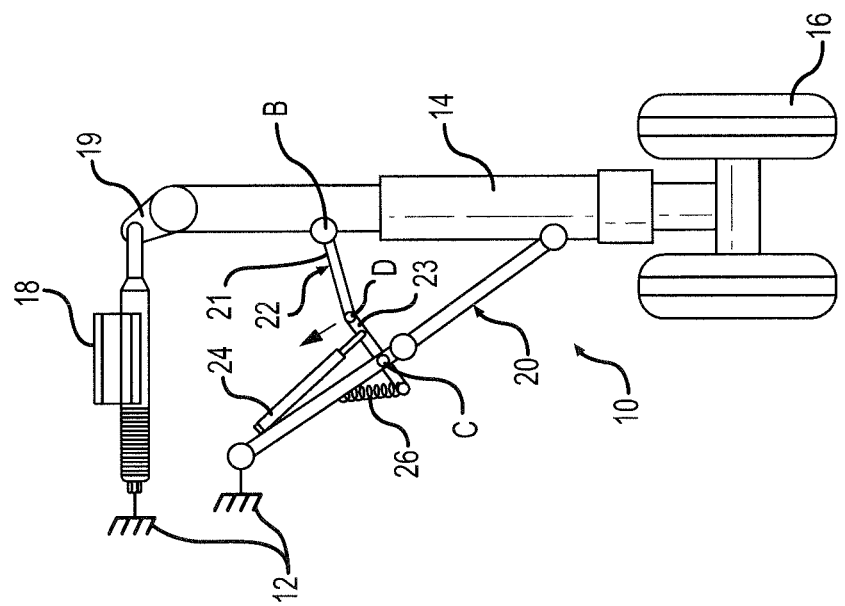

With initial reference to FIGS. 1A and 1B, a retraction sequence of a landing gear 10 in accordance with various embodiments is disclosed. In various embodiments, landing gear 10 includes a strut 14 supporting wheels 16. Strut 14 is rotatable about a pivot, which is provided by an airframe 12, in response to an extend/retract actuator 18 applying a force to an arm 19. A linkage 20 may connect a lower portion of strut 14 to airframe 12, for example. A lock-stay 22 may be interconnected between linkage 20 and strut 14 to lock landing gear 10 in a deployed position until landing gear retraction is commanded.

In FIG. 1A, landing gear 10 is shown in the deployed position and in FIG. 1B, landing gear 10 is shown during a retraction sequence and prior to being fully retracted (e.g., stowed). The example lock-stay 22 includes first and second links 21, 23 pivotally secured to one another at a joint D. One end of first link 21 is connected to strut 14 at pivot B. A portion of second link 23 is connected to linkage 20 at pivot C. A biasing member 26 is arranged between lock-stay 22 and linkage 20 to bias lock-stay 22 to the locked position. An unlock actuator 24 is interconnected between linkage 20 and lock-stay 22 to pull joint D from over-center, as depicted by the arrow in FIG. 1B, so that extend/retract actuator 18 can move landing gear 10 to a stowed position.

Figure 2:
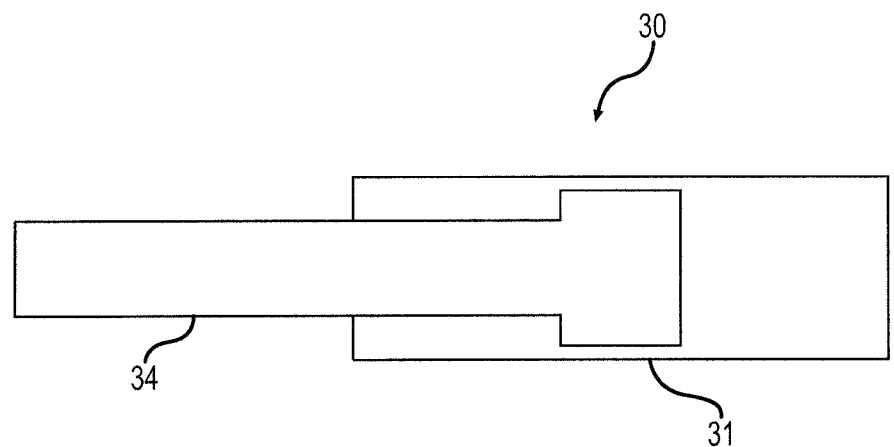
FIG. 2 illustrates a schematic view of an actuator in accordance with various embodiments.

With initial reference to FIG. 2, a schematic diagram of actuator 30 in accordance with various embodiments is disclosed. Actuator 30 may comprise, for example, an extend/retract actuator 18 or an unlock actuator 24 (as illustrated in FIGS. 1A and 1B), or any other type of actuator suitable for use in body-type landing gear systems. Further, actuator 30 may comprise an actuator suitable for use in other systems, including flight control systems, wing and nose landing gear systems, and any other system which utilizes one or more actuators, including non-aircraft systems. Actuator 30 may comprise an actuator body 31 into which a composite actuator rod tube 34 (also referred to as an actuator piston) retracts and extends. Actuator 30 may comprise, for example an extend/retract actuator 18 or an unlock actuator 24 (as illustrated in FIGS. 1A and 1B), or any other type of actuator suitable for use in body-type landing gear systems. Further, actuator 30 may comprise an actuator suitable for use in other systems, including flight control systems, wing and nose landing gear systems, and any other system which utilizes one or more actuators, including non-aircraft systems.

Figure 3A:
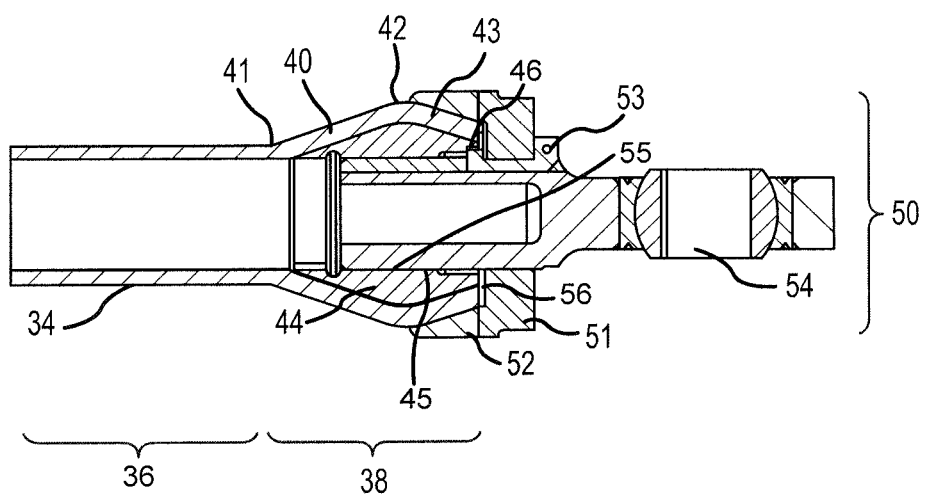
FIGS. 3A, and 3B illustrate, respectively, a cross-sectional view, and an exploded view of an actuator in accordance with various embodiments.
Figure 3B:
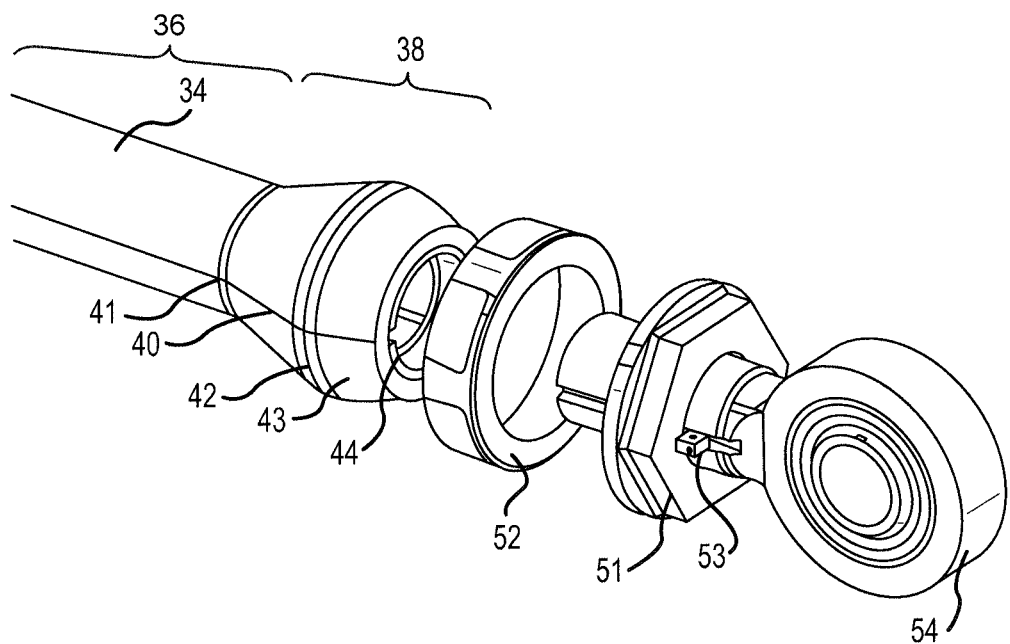

In various embodiments, with reference to FIGS. 3A-3B, actuator 30 comprises a composite actuator rod tube 34. Composite actuator rod tube 34 may comprise, for example, a lightweight polymer matrix composite such as a carbon fiber composite material or a hydrocarbon fiber composite material. Although composite materials provide reduced weight over traditional metal components, it may be difficult to couple composite materials to metal components. Conventional methods of attaching composite materials to other materials, such as threading or drilling holes in the composite material, may significantly reduce the strength of the composite material. Therefore, methods and apparatus for connecting composite material components (such as composite actuator rod tube 34) to other components (such as metallic components) may be desirable.

Composite actuator rod tube 34 may comprise an unflared portion 36 and a flared end 38. In various embodiments, flared end 38 is formed of a lightweight polymer matrix composite material. For example, flared end 38 may comprise the same material as unflared portion 36. Flared end 38 may be configured to provide a flared surface to engage with a rod end assembly 50, which may engage other component(s) desired to be translated by the actuator 30. As will be discussed in greater detail, a rod end assembly 50 may be secured against and held within flared end 38, eliminating the need for threading or drilling of unflared portion 36 and/or flared end 38, which would reduce the strength of and/or compromise the structural integrity of composite actuator rod tube 34.

Composite actuator rod tube 34, both unflared portion 36 and flared end 38, may be formed by laying composite sheets or layers in a desired shape and bonding the layers together using resins, adhesives, or other bonding agents. In further embodiments, composite actuator rod tube 34 may be formed using a fiber-wound form, wherein fiber is continuously wound onto the form and bonded together using resins, adhesives, or other bonding agents. Any manner of forming composite actuator rod tube 34 is within the scope of the present disclosure.

During or after formation, flared end 38 may pretensioned. For example, flared end 38 may be pretensioned for tensile and/or compressive loads. Such pretensioning may reduce fretting and/or extend the fatigue life of flared end 38.

In various embodiments, an embedded nut 44 is positioned within flared end 38. Embedded nut 44 may comprise a flared nut having a shape that is complementary to flared end 38. As will be discussed in greater detail, embedded nut 44 may be positioned within flared end 38 and held in compression and/or tension by components located outside of composite actuator rod tube 34. In various embodiments, embedded nut 44 may be placed within and bonded to flared end 38 during formation of composite actuator rod tube 34 and flared end 38. Embedded nut 44 may comprise, for example, a metallic material. However, embedded nut 44 may comprise any suitable material. As illustrated in FIG. 3A, flared end 38 may comprise a triangular profile and embedded nut 44 may comprise a complementary profile shaped to be received within flared end 38.

Embedded nut 44 may comprise, for example, a threaded surface 45. In various embodiments, threaded surface 45 of embedded nut 44 extends inwardly from embedded nut 44, which may form an annulus, and is configured to receive one or more components capable of interconnecting with embedded nut 44 via threaded surface 45. Embedded nut 44 may further comprise a key receiving segment 46. In various embodiments, key receiving segment 46 may provide a location, for example, a slot, to hold as stationary one or more components that are engaged to threaded surface 45, such as components of a rod end assembly 50 including a rod attachment end 54 and/or locking mechanism 53.

Flared end 38 may comprise various components. For example flared end 38 may comprise a first angle 41 disposed between and formed at the intersection of the unflared portion 36 and a first flared section 40, and a second angle 42 disposed between and formed at the intersection of the first flared section 40 and a second flared section 43. In this manner, the first flared section 40 of flared end 38 may comprise an increasing diameter relative to a diameter of the unflared portion 36. However, the diameter of first flared section 40 is no less than the diameter of the unflared portion 36. Second angle 42 may be an equal angle to first angle 41 although oriented in the opposite direction, such as relative to a line parallel to the surface of the unflared portion 36. For instance, second angle 42 may descend from a line parallel to the surface of the unflared portion 36 and the first angle 41 may ascend from a line parallel to the surface of the unflared portion 36 by an equal angle. Thus, the second flared section 43 of flared end 38 may comprise a decreasing diameter starting from the intersection with the first flared section 40. However, the diameter of the second flared section 43 may be no less than the diameter of the unflared portion 36. In various embodiments, all portions of the composite actuator rod tube 34 comprise a uniform material thickness. However, in further embodiments, the thickness of the material may vary, for example, being thicker at the location near the first angle 41 and/or second angle 42, such as for increased strength.

The flared end 38 may receive a rod end assembly 50. For example, the embedded nut 44 comprising a threaded surface 45 may receive a corresponding threaded surface 55 of a rod attachment end 54. A rod attachment end 54 may comprise a threaded bolt member extending inwardly into the embedded nut 44, and permitting the attachment of a component of actuator 30.

The rod end assembly 50 may further comprise a external nut 51. The external nut 51 may thread along the threaded surface 55 of the rod attachment end 54. In this manner, the rod attachment end 54 may be loaded in tension along the threaded surface 55 by the embedded nut 44 and the external nut 51. For instance, the rod end assembly 50 may further comprise a wedge 52. Wedge 52 may be disposed over the second flared section 43 and comprise a corresponding angle to that of the second angle 42. As such, the wedge 52 may compress the second flared section 43 against the embedded nut 44 in response to a force exerted by the external nut 51 as it is tightened against the wedge 52 and rests proximate to the wedge 52. Thus, the entire stack of the embedded nut 44, the second flared section 43, the wedge 52, and the external nut 51 may loaded in compression, a tensile reaction force being loaded in the threaded surface 55 of the rod attachment end 54. In this manner, the rod attachment end 54 is securely held in substantially fixed position relative to the composite actuator rod tube 34. The external nut 51 may comprise a flared end clearance impression 56. The flared end clearance impression 56 may comprise a surface of the external nut 51 shaped to provide clearance to second flared section 43 of the flared end 38 so that it does not bear the compressive load of the tightened nut, but rather provides clearance so that this load may be born by the wedge 52.

The rod end assembly 50 may further comprise locking mechanism 53. The locking mechanism 53 may comprise a locking key, such as a member having a u-shaped profile and extending into a key receiving segment 46 of the embedded nut 44. The locking mechanism 53 may be carried by the external nut 51, so that when the external nut 51 is properly seated relative to the embedded nut 44 (e.g., is tightened to a proper clearance from the embedded nut 44), the locking mechanism 53 enters the key receiving segment 46 and prevents the embedded nut 44 and/or external nut 51 from unwanted rotation. In this manner, unwanted rotation and unthreading of the rod end assembly 50 from the composite actuator rod tube 34 may be ameliorated.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An actuator comprising:
   a composite actuator rod tube comprising an unflared portion and a flared end;
   an embedded nut having a threaded surface, wherein the embedded nut has a complementary shape to the flared end; and
   a rod end assembly comprising:
      a rod attachment end comprising a threaded surface configured to engage with the threaded surface of the embedded nut; and
      a wedge configured to compress a portion of the flared end; and
      an external nut separate from the rod attachment end, proximate to the wedge, and configured to exert a compression force against the wedge.

2. The actuator of claim 1, wherein the external nut is configured to engage the threaded surface of the rod attachment end.

3. The actuator of claim 1, the flared end comprising:
   a first flared section extending from the unflared portion;
   a first angle disposed between and formed at an intersection of the unflared portion and the first flared section;
   a second flared section extending in an opposite direction from the first flared section; and
   a second angle disposed between and formed at an intersection of the first flared section and the second flared section.

4. The actuator of claim 3, the external nut further comprising a flared end clearance impression comprising a surface of the external nut providing clearance to the second flared section of the flared end.

5. The actuator of claim 1, wherein the rod end assembly comprises a locking mechanism configured to prevent the external nut from loosening.

6. The actuator of claim 5, wherein the locking mechanism comprises a locking key.

7. The actuator of claim 6, wherein the embedded nut comprises a key receiving segment configured to receive the locking key.

8. The actuator of claim 1, wherein the embedded nut comprises metal.

9. The actuator of claim 1, wherein the composite actuator rod tube comprises at least one of layered composite sheets or wound fiber.

10. The actuator of claim 1, the flared end comprising a triangular profile and the embedded nut comprising a complementary profile received within the flared end.

11. The actuator of claim 1, wherein the embedded nut is bonded to the flared end of the composite actuator rod tube.

12. A method for forming an actuator comprising:
   forming a composite actuator rod tube having a flared end concentrically surrounding an embedded nut having a complementary shape to the flared end;
   bonding the embedded nut to the flared end, wherein the embedded nut comprises a threaded surface; and
   attaching a rod end assembly to the embedded nut, the rod end assembly comprising a rod attachment end, the rod attachment end comprising a threaded surface configured to engage with the threaded surface of the embedded nut, and an external nut that is separate from the rod attachment end.

13. The method according to claim 12, further comprising compressing a portion of the flared end by a wedge.

14. The method according to claim 13, further comprising:
   positioning an external nut proximate to the wedge and exerting by the external nut a force against the wedge; and inserting a locking key of the rod end assembly into a key receiving segment of the embedded nut, whereby the external nut is prevented from loosening.

15. An actuator comprising:
   a composite actuator rod tube comprising an unflared portion and a flared end;
   an embedded nut having a threaded surface and a complementary shape to the flared end;
   an external nut; and a rod end assembly comprising:
  a rod attachment end comprising a threaded surface configured to engage with the threaded surface of the embedded nut;
  a locking mechanism comprising a locking key configured to prevent the external nut from loosening; and
  a wedge configured to compress a portion of the flared end;
wherein the external nut is located proximate to the wedge, and configured to exert a compression force against the wedge.

16. The actuator of claim 15 wherein the interior nut further comprises a key receiving segment configured to receive the locking key.

* * * * *